United States Patent [19]

Wickizer

[11] Patent Number: 5,030,053
[45] Date of Patent: Jul. 9, 1991

[54] ROUND HAY BALE TRANSPORTER/FEEDER

[76] Inventor: Albert L. Wickizer, Rte. 1, Box 19, Aledo, Tex. 76008

[21] Appl. No.: 417,061

[22] Filed: Oct. 4, 1989

[51] Int. Cl.$^5$ .............................................. A01D 90/00
[52] U.S. Cl. ................................. 414/24.5; 414/475; 414/483; 298/20 R
[58] Field of Search ................... 414/24.5, 475, 483, 414/484, 485; 298/15, 20 R; 280/408, 149.2, 491.3

[56] References Cited

U.S. PATENT DOCUMENTS

| | | | |
|---|---|---|---|
| 1,677,618 | 7/1928 | Clement | 280/491.3 X |
| 2,219,585 | 10/1940 | Begin | 280/408 X |
| 2,925,186 | 2/1960 | Anderson et al. | 414/483 |
| 3,664,687 | 5/1972 | Nutt, Jr. et al. | 280/491.3 |
| 3,935,954 | 2/1976 | Woods et al. | 414/24.5 |
| 3,938,682 | 2/1976 | Rowe . | |
| 3,985,253 | 10/1976 | Kannady et al. . | |
| 4,023,693 | 5/1977 | Priefert . | |
| 4,037,741 | 7/1977 | Smith . | |
| 4,044,907 | 8/1977 | Craft . | |
| 4,062,454 | 12/1977 | Priefert . | |
| 4,068,892 | 1/1978 | Welch | 298/23 DX |
| 4,098,425 | 5/1978 | Baltz . | |
| 4,295,772 | 10/1981 | Zimmerman . | |
| 4,348,143 | 9/1982 | Hedgespeth | 414/24.5 |
| 4,394,105 | 7/1983 | Mitchell | 414/485 X |
| 4,396,330 | 8/1983 | Rozeboom | 414/24.5 |
| 4,573,845 | 3/1986 | Carpenter | 414/24.5 |
| 4,621,776 | 11/1986 | Hostetler | 414/24.6 |
| 4,639,043 | 1/1987 | Morissette | 414/485 X |
| 4,643,625 | 2/1987 | Horner | 414/24.5 |
| 4,784,546 | 11/1988 | Johnson | 414/24.5 X |

FOREIGN PATENT DOCUMENTS

| | | | |
|---|---|---|---|
| 2523915 | 9/1983 | France | 414/24.5 |
| 39706 | 6/1965 | German Democratic Rep. | 298/230 |
| 0600014 | 3/1978 | U.S.S.R. | 298/15 |
| 1486894 | 9/1977 | United Kingdom | 414/475 |

Primary Examiner—Robert J. Spar
Assistant Examiner—William M. Hienz
Attorney, Agent, or Firm—Harold E. Meier

[57] ABSTRACT

A bale handling apparatus for receiving, transporting, discharging, and feeding of large round bales of hay is provided. The apparatus includes an upwardly open semi-cylindrical cradle rotatably supported above a trailer frame on a scissor device attached to the trailer frame and an undercarriage slideably mounted on the trailer frame. A restraining bail is pivotally mounted to the top of the cradle for restraining the bale of hay as the cradle is rotated. A hitch mechanism is attached to the trailer for connecting the apparatus to a towing vehicle.

As the invention moves in a rearward or forward direction the undercarriage slides along the frame causing the scissor to open and close, and thereby raising or lowering the cradle into engagement or disengagement with the underlying surface, causing rotation of the cradle for receiving, transporting, and discharging the bale of hay.

8 Claims, 2 Drawing Sheets

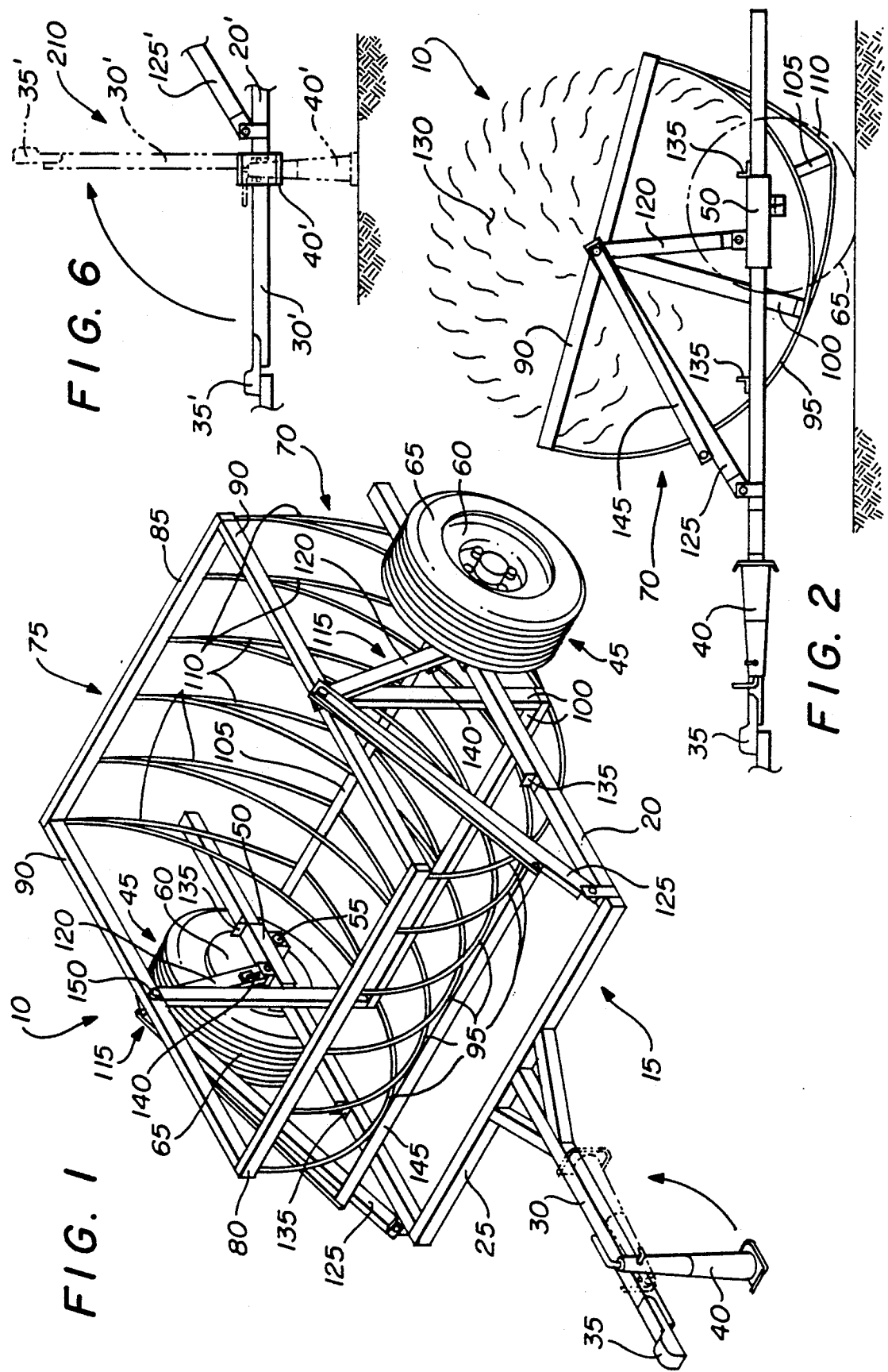

ROUND HAY BALE TRANSPORTER/FEEDER

TECHNICAL FIELD

This invention relates to apparatus for handling large bales of hay, and more particularly to a hay handling apparatus which can load, discharge, and feed large round bales of hay automatically.

BACKGROUND OF THE INVENTION

The agriculture and livestock industries have, in increasing numbers, abandoned use of conventional small rectangular bales of hay in favor of large round bales. The large round bales have proven less susceptible to damage from exposure to the elements, alleviating the need for covered storage and the labor involved in removing the small rectangular bales from the field and stacking them for storage. Feeding of livestock from one large round bale involves less time and labor in delivering the hay to the feeding location.

Transporting of the large round bales cannot be accomplished in the same manner as with the small conventional bales. Unlike small conventional bales, large round bales cannot be lifted by one individual, nor can they be easily thrown into the back of a pickup truck or other farm vehicle. Yet, the large round bales often must be transported from the baling site to the feeding site, an alternate storage location, or to the property of a purchaser.

Presently available means for carrying large round bales of hay are high in cost, require some operation by the farmer or operator outside the towing vehicle, involve complicated lifting mechanisms, and most allow for the transportation of only one round bale at a time.

SUMMARY OF THE INVENTION

The present invention comprises a self-loading apparatus for receiving, transporting, delivering, and feeding round bales of hay or other appropriate commodity, which overcomes the foregoing and other problems long since associated with the prior art by loading, transporting, and unloading the round bales of hay automatically; allowing connection of multiple trailers in a train configuration for transportation of more than one bale at a time; and converting to a freestanding crib for direct livestock feeding.

More specifically, the invention comprises a generally "U" shaped trailer frame supporting a pivotally mounted cradle. An undercarriage is slideably mounted on the trailer frame and is pivotally connected to the base of the cradle support. A bail for automatically restraining the hay as it is loaded into the cradle is pivotally mounted on the top of the cradle.

Attached to the exterior curved edge of the cradle is a flange which engages with the underlying surface as the cradle is lowered by applying the brakes of the undercarriage while moving the trailer in a rearward direction, thereby causing the undercarriage to slide forward along the trailer frame, lowering the level of the cradle in relation to the underlying surface. When the flange engages with the underlying surface, it forces rotation of the cradle into position for receiving or discharging the round bale of hay.

A removable hitch is mounted to the rear of the "U" shaped frame for connecting a following trailer to the rear of a leading trailer, thereby allowing transportation and placement for feeding of more than one round bale of hay at a time.

In one embodiment of the invention, the hitch portion of the trailer frame is pivotally mounted to the "U" shaped portion of the frame to allow the hitch to be pivoted into a vertical position when the invention is free standing for direct feeding of livestock. Other advantages deriving from the use of the invention will readily suggest themselves to those skilled in the art.

BRIEF DESCRIPTION OF THE DRAWINGS

For a more complete understanding of the present invention and the advantages thereof, reference is now made to the following Detailed Description taken in conjunction with the accompanying Drawings in which:

FIG. 1 is a perspective view of a bale handling apparatus, comprising an embodiment of the invention;

FIG. 2 is a side view of the bale handling apparatus of FIG. 1 in the transportation and freestanding positions with the wheel and tire shown in phantom;

FIG. 6 is a partial view similar to FIG. 2, showing a bale handling apparatus comprising a modification of the illustrated embodiment of the invention.

DETAILED DESCRIPTION

Figure 3:
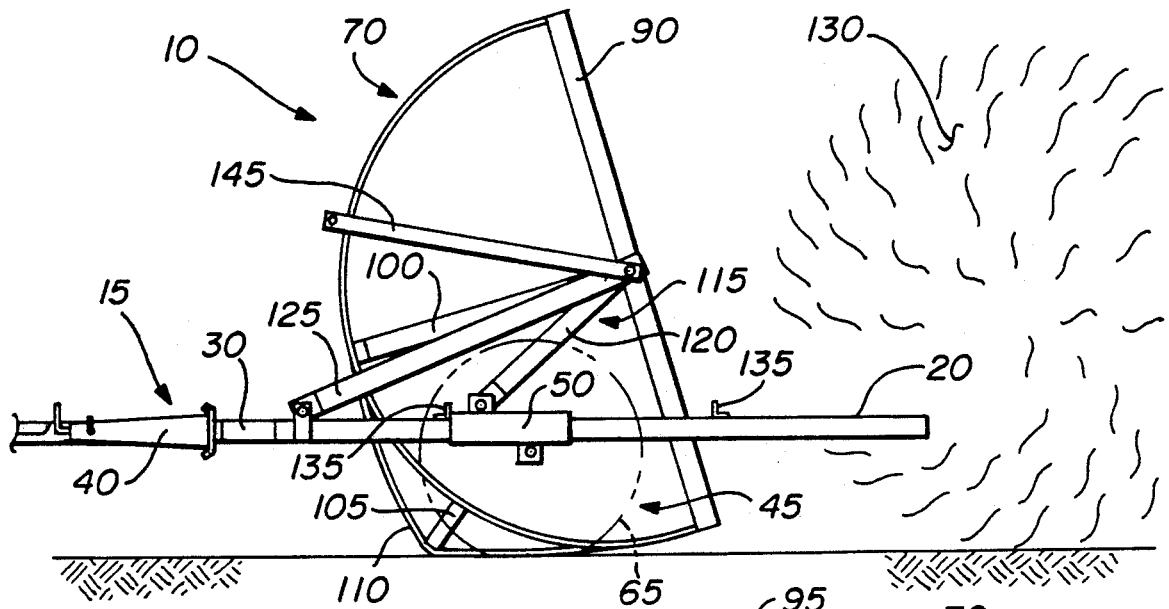
FIG. 3 is a side view of the bale handling apparatus of FIG. 1, illustrating the rotation of the cradle as the apparatus is backed into position for loading of a round bale of hay.

Referring now to the Drawings, and particularly to FIG. 1 thereof, there is shown a bale handling apparatus 10 incorporating an embodiment of the invention. The apparatus 10 includes a generally "U" shaped trailer frame 15 comprising a pair of opposed parallel longitudinally extending loadbearing beams 20 fixedly attached to one end to a cross beam 25. Fixedly attached to the cross beam is a tongue member 30 having a hitch mechanism 35 mounted to the distal end thereof for connecting the apparatus 10 to a towing vehicle. Attached to the body of the tongue member 30 is an outrigger 40 for supporting the apparatus 10 in a freestanding position.

The apparatus 10 is supported in a normally horizontal orientation for movement over an underlying surface by undercarriages 45. The undercarriages 45 are supported on sleeves 50 which are slideably mounted on each of the loadbearing beams 20. Mounted to the sleeves 50 are axle assemblies 55 having a wheel 60 rotatably mounted on the outwardly extending end of each axle assembly 55. A tire 65 is mounted on each wheel 60. The undercarriage has a conventional electrical braking system operated from inside the towing vehicle.

Mounted to and suspended above the trailer frame 15 is a cradle 70 comprising a rigid frame 75 having a leading edge 80, a trailing edge 85 and opposed sides 90. Attached to the rigid frame 75 are evenly spaced metal rods 95 formed into a semi-cylindrical shape and attached at one end to the leading edge 80 and at the other end to the trailing edge 85 of the rigid frame 75 of the cradle 70. A metal brace 100 is fixedly mounted to the underside of the rigid frame 75 at a point midway between the leading edge 80 and trailing edge 85 and extends to the apex of the curved surface of the cradle 70 as defined by the metal rods 95, and transversely across the width of the cradle 70 to add support to the curved metal rods 95 and to act as a central attaching point for the metal rods 95. Although in the preferred invention the semi-cylindrical shape of the cradle 70 is defined by curved metal rods 95 and the metal support brace 100, other conventional types of materials may be utilized to define the shape of the cradle in the practice of the invention in accordance with particular requirements.

Again referring to FIG. 1, mounted to the exterior of the curved surface of the cradle 70, at a point between the apex of the cradle 70 and the trailing edge 85 of the cradle, is a flange 105. In the preferred embodiment of the invention, the flange 105 is supported and held in place by evenly spaced metal rods 110 attached at one end to the corresponding metal rods 95 and the trailing edge 85 and at the other end to the corresponding metal rods 95 and the metal support brace 100.

As shown in FIGS. 1 AND 2, the cradle 70 is mounted above the trailer frame 15 by scissor devices 115, each comprising a strut 120 pivotally attached at one end to the side 90 of the rigid frame 75 of the cradle 70 at a point between the leading edge 80 and trailing edge 85, and pivotally mounted at the other end to the undercarriage sleeve 50. An arm 125 is pivotally attached at one end to the loadbearing beam 20 slightly aft of the cross beam 25 of the trailer frame 15 and pivotally attached at the other end to the strut 120 at the attachment point of the strut 120 to the side 90. When the undercarriage 45 slides in a rearward direction over the loadbearing beam 20 of the trailer frame 15 the scissor device 115 opens, and as the undercarriage 45 slides in a forward direction over the loadbearing beam 20, the scissor device 115 closes.

Referring particularly to FIG. 3, as the bale handling apparatus 10 moves in a rearward direction the brakes are applied creating friction between the tires 65 and the underlying surface causing the undercarriage 45 to slide forward along the loadbearing beam 20, thereby changing the angle between the strut 120 and the arm 125 of the scissor devices 115 to initiate the lowering of the cradle 70 to bring the flange 105 into contact with the underlying surface. As the flange 105 contacts the underlying surface, the apparatus 10 is lifted slightly to allow the undercarriage 45 to slide to the most forward position along the loadbearing beam 20 of the trailer frame 15. In that manner, the cradle 70 is rotated into position for receiving the bale of hay 130. As shown in FIGS. 1 and 3, stops 135 limit the distance the undercarriage 45 slides along the loadbearing beam 20.

Figure 4:
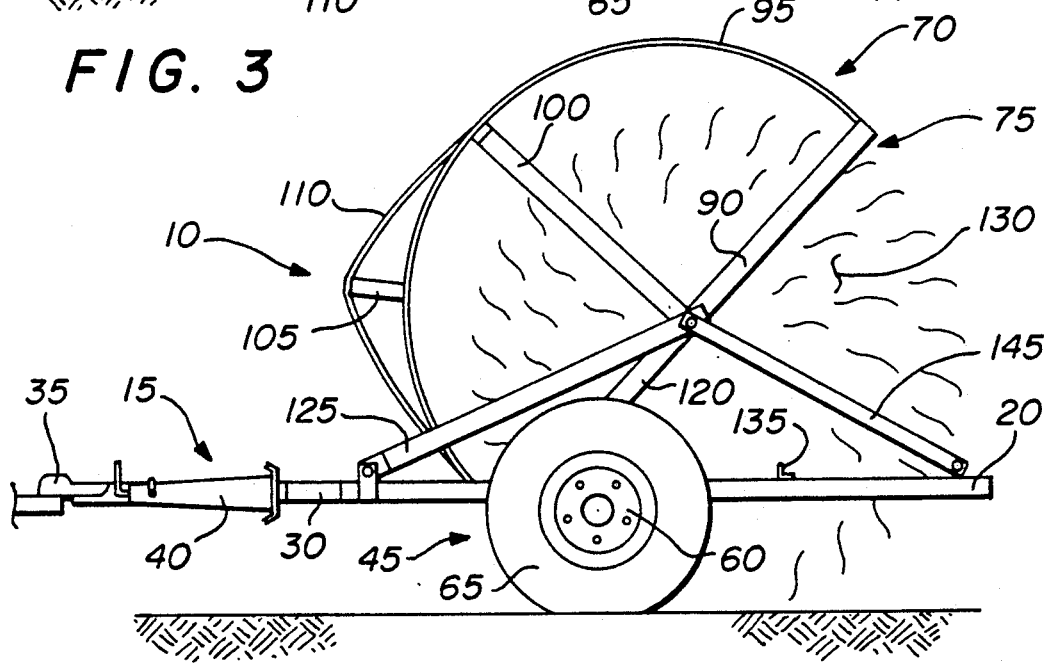
FIG. 4 is a side view of the bale handling apparatus of FIG. 1, illustrating the rotation of the cradle into position surrounding the round bale of hay and the pivoting of the bail into position to restrain the bale.

Referring to FIGS. 1 and 4, stops 140 (see FIG. 1) are mounted to the struts 120 of the scissor devices 115 so that as the trailing edge 85 contacts the bale of hay 130 and forces the cradle 70 to continue to rotate about the attachment point of the strut 120, the side 90 contacts the stop 140 thereby preventing further rotation of the cradle 70. Such action pivots the bail 145 to a position restraining the bale of hay 130 in the cradle 70 for rotation of the cradle 70 back into an upright position.

To rotate the cradle 70 into an upright position, the brakes are again applied to the undercarriage 45, creating friction between the tires 65 and the underlying surface, thereby forcing the undercarriage 45 to slide in a rearward direction over the loadbearing beam 20. As the undercarriage 45 slides in a rearward direction, the scissor device 115 is opened, causing the cradle 70 to begin a rotating motion about the attachment point of the strut 120 to the side 90. As the cradle rotates, the flange 105 is brought back into contact with the underlying surface, thereby slightly raising the hay handling apparatus 10 to allow the undercarriage to continue to slide in a rearward direction against the stops 135, rotating the cradle 70 into an upright position as shown in FIG. 2. The bail 145 restrains the bale of hay 130 within the cradle 70 until the cradle 70 reaches an upright position, at which time the bail 145 falls forward over the leading edge 80. Stops 150 (see FIG. 1) mounted to the side 90 at the pivotal attachment point of the bail 145 to the rigid frame 75 prevents the bail 145 from falling rearward over the trailing edge 85 as the cradle 70 returns to the upright position.

Upon returning to the upright position, as shown in FIGS. 1 and 2, the bale handling apparatus 10 is in position for transporting the bale of hay 130, or lowering the outrigger 40 to support the hay handling apparatus 10 in a freestanding position for direct feeding of livestock from the bale handling apparatus.

Figure 5:
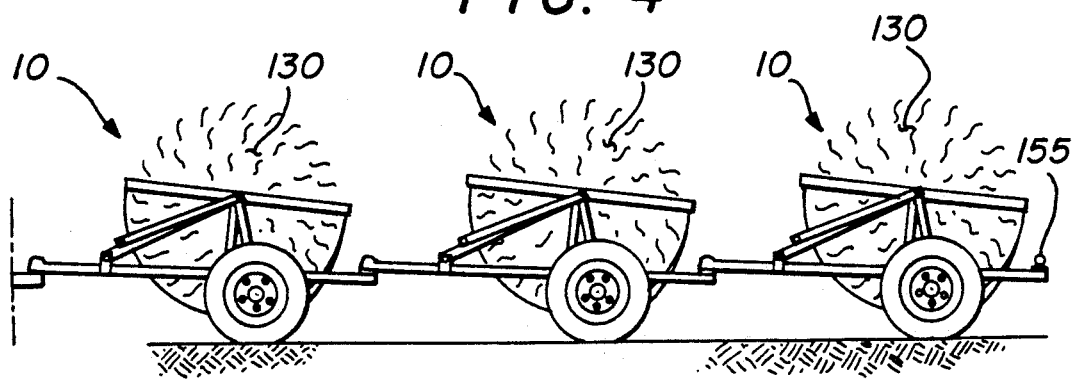
FIG. 5 is a side view illustrating the connection of multiple bale handling apparatus of FIG. 1 to one another.

As illustrated in FIG. 5, the bale handling apparatus 10 includes a removable hitch 155 attached to the distal ends of the loadbearing beams 20 to allow connection of multiple bale handling apparatus 10 to one another, thereby providing for transportation of more than one bale of hay 130 at a time.

Referring now to FIG. 6, there is shown a bale handling apparatus 210 incorporating a modification of the illustrated embodiment of the invention. Many of the component parts of the bale handling apparatus 210 are substantially identical in construction and function to component parts of the bale handling apparatus 10 shown in FIGS. 1 through 5. Such identical component parts as shown are designated in FIG. 6 by the same reference numerals utilized above in connection with the description of the bale handling apparatus 10, but are differentiated therefrom by a prime "'" designation.

Referring to FIG. 6, the tongue member 30' of the "U" shaped trailer frame 15' is pivotally attached to the cross beam 25' to allow the tongue member 30' to be pivoted to a generally vertical position. The outrigger 40' is mounted to the cross beam 25' and, as shown in phantom, may be lowered to support the bale handling apparatus 210 in a freestanding position.

Although the invention has been described in detail, it is to be clearly understood that the same is by way of illustration and example only and is not to be taken by way of limitation, the spirit and scope of the invention being limited only to the terms of the appended claims.

I claim:

1. Bale handling apparatus for receiving, loading, transporting, delivering and discharging a round bale of hay or other appropriate commodity, comprising:
   a trailer frame having a pair of longitudinally extending load bearing beams, a transverse cross beam attached to one end of the load bearing beams, and a tongue member with hitch attached to the cross beam;
   a cradle having an upright position for supporting the bale and a rotated position to enclose and surround the circumference of the bale during receiving, loading and discharging;
   means for rotatably supporting the cradle on the trailer frame, said means for rotatably supporting comprising:

a pair of struts each pivotally attached at one end to the top of the cradle and pivotally mounted at the other end to the undercarriage; and a pair of arms each pivotally mounted at one end to the trailer frame at a point slightly aft of the front edge of the trailer frame and pivotally attached at the other end to the respective strut at the point of attachment of the strut to the top of the cradle;

means mounted to the cradle for restraining the bale within the cradle as the cradle is rotated from the rotated position to the upright position; and an undercarriage mounted to the load bearing beams of the trailer frame to slide between a rearward position and a forward position, and attached to said means for rotatably supporting the cradle so that the cradle rotates between the upright position and the rotated position in response to the sliding motion of the undercarriage along the load bearing beams between the rearward position and the forward position.

2. The bale handling apparatus of claim 1 wherein the cradle comprises:

a rigid upwardly open semi-cylindrical surface; and a flange mounted to the exterior of the semi-cylindrical surface for engaging the underlying surface to assist in rotating the cradle between the upright position and the rotated position.

3. The bale handling apparatus as described in claim 1, further comprising stop means mounted to each strut contacting the top of the cradle to limit rotation of the cradle.

4. The bale handling apparatus of claim 1 wherein the means for restraining comprises a bail pivotally attached at each end to opposed sides of the top of the cradle so that rotation of the cradle from the upright position to the rotated position pivots the bail around the bale for restraining the bale within the cradle as the cradle rotates to the upright position.

5. Bale handling apparatus for receiving, loading, transporting, delivering and discharging a round bale of hay or other appropriate commodity, comprising:

a generally "U" shaped trailer frame;

a cradle rotatably mounted to the trailer frame for receiving, supporting, and discharging the bale;

means for rotatably supporting the cradle on the opposed sides of the trailer frame to enable rotation of the cradle about a horizontal axis between an upright position for supporting the bale and a rotated position to enclose and surround the bale during receiving and discharging, said means for rotatably supporting comprising:

a pair of struts each pivotally attached at one end to the top of the cradle at a point between the leading and trailing edges of the cradle and pivotally mounted at the other end to the undercarriage; and a pair of arms each pivotally mounted at one end to the trailer frame at a point slightly aft of the front edge of the trailer frame and pivotally attached at the other end to the respective strut at the point of attachment of the strut to the top of the cradle;

means mounted to the cradle for restraining the bale within the cradle as the cradle is rotated;

an undercarriage mounted to the trailer frame to slide between a rearward position and a forward position, and attached to said means for rotatably supporting the cradle so that the cradle rotates between the upright position and the rotated position in response to the sliding motion of the undercarriage along the trailer frame between the rearward position and the forward position; and braking means mounted to the undercarriage, said braking means, when actuated, causing the undercarriage to slide between the rearward position and the forward position.

6. The bale handling apparatus of claim 5 wherein the cradle comprises:

an upwardly open semi-cylindrical surface for accepting a bale; and a flange mounted to the exterior of the semi-cylindrical surface.

7. The bale handling apparatus as described in claim 5, further comprising stop means mounted to each strut for contacting the top of the cradle to limit rotation of the cradle.

8. The bale handling apparatus of claim 5 wherein the means for restraining comprises a bail pivotally attached at each end to opposed sides of the top of the cradle so that rotation of the cradle to the rotated position pivots the bail above the top of the cradle relative to the leading and trailing edges of the cradle and about the bale.

* * * * *